(12) United States Patent
Duffy et al.

(10) Patent No.: US 11,922,619 B2
(45) Date of Patent: Mar. 5, 2024

(54) CONTEXT-BASED DEFECT INSPECTION

(71) Applicant: KLA Corporation, Milpitas, CA (US)

(72) Inventors: Brian Duffy, San Jose, CA (US); Bradley Ries, San Jose, CA (US); Laurent Karsenti, Rehovot (IL); Kuljit S. Virk, Fremont, CA (US); Asaf J. Elron, Ramat Hasharon (IL); Ruslan Berdichevsky, Zoran (IL); Oriel Ben Shmuel, Netanya (IL); Shlomi Fenster, Beit Shemesh (IL); Yakir Gorski, Givatayim (IL); Oren Dovrat, Tel Aviv-Jaffa (IL); Ron Dekel, Givatayim (IL); Emanuel Garbin, Tel Aviv-Jaffa (IL); Sasha Smekhov, Kiryat Ono (IL)

(73) Assignee: KLA Corporation, Milpitas, CA (US)

(*) Notice: Subject to any disclaimer, the term of this patent is extended or adjusted under 35 U.S.C. 154(b) by 0 days.

(21) Appl. No.: 18/128,140

(22) Filed: Mar. 29, 2023

(65) Prior Publication Data
US 2023/0316500 A1    Oct. 5, 2023

Related U.S. Application Data

(60) Provisional application No. 63/443,050, filed on Feb. 3, 2023, provisional application No. 63/326,268, filed on Mar. 31, 2022.

(51) Int. Cl.
*G06T 7/00* (2017.01)

(52) U.S. Cl.
CPC .... *G06T 7/001* (2013.01); *G06T 2207/20076* (2013.01); *G06T 2207/20084* (2013.01); *G06T 2207/30148* (2013.01)

(58) Field of Classification Search
CPC .......... G06T 7/001; G06T 2207/20076; G06T 2207/20084; G06T 2207/30148
See application file for complete search history.

(56) References Cited

U.S. PATENT DOCUMENTS

| 7,877,722 B2 | 1/2011 | Duffy et al. |
| 8,126,255 B2 | 2/2012 | Bhaskar et al. |

(Continued)

FOREIGN PATENT DOCUMENTS

| JP | 2004327950 A | 11/2004 |
| JP | 4789630 B2 | 10/2011 |

(Continued)

OTHER PUBLICATIONS

Amano, "Defect Detection starter (U-Net), Severstal: Steel Defect Detection", Aug. 3, 2019, 25 pages.

(Continued)

*Primary Examiner* — Ping Y Hsieh
(74) *Attorney, Agent, or Firm* — Suiter Swantz pc llo (57) ABSTRACT

A context-based inspection system is disclosed. The system may include an optical imaging sub-system. The system may further include one or more controllers communicatively coupled to the optical imaging system. The one or more controllers may be configured to: receive one or more reference images; receive one or more test images of a sample; generate one or more probabilistic context maps during inspection runtime using an unsupervised classifier; provide the generated one or more probabilistic context maps to a supervised classifier during the inspection runtime; and apply the supervised classifier to the received one or more test images to identify one or more DOIs on the sample.

27 Claims, 8 Drawing Sheets

(56) References Cited

U.S. PATENT DOCUMENTS

| | | | |
|---|---|---|---|
| 8,611,639 | B2 | 12/2013 | Kulkarni et al. |
| 9,183,624 | B2 | 11/2015 | Karsenti et al. |
| 9,262,821 | B2 | 2/2016 | Shifrin et al. |
| 9,518,934 | B2 | 12/2016 | Chen et al. |
| 9,613,411 | B2 | 4/2017 | Konuru et al. |
| 9,619,876 | B2 | 4/2017 | Huang et al. |
| 10,346,740 | B2 | 7/2019 | Zhang et al. |
| 10,395,358 | B2 | 8/2019 | Brauer et al. |
| 10,504,213 | B2 | 12/2019 | Brauer |
| 10,533,848 | B2 | 1/2020 | Shchegrov et al. |
| 10,535,131 | B2 | 1/2020 | Maher et al. |
| 10,557,802 | B2 | 2/2020 | Brauer et al. |
| 10,599,944 | B2 | 3/2020 | Lee et al. |
| 10,801,968 | B2 | 10/2020 | Brauer |
| 10,923,317 | B2 | 2/2021 | Huang et al. |
| 10,943,838 | B2 | 3/2021 | Hoo et al. |
| 11,010,885 | B2 | 5/2021 | Brauer et al. |
| 11,120,546 | B2 | 9/2021 | Brauer et al. |
| 11,270,430 | B2 | 3/2022 | Sezginer et al. |
| 11,415,526 | B2 | 8/2022 | Duffy et al. |
| 11,415,531 | B2 | 8/2022 | Gaind et al. |
| 11,416,982 | B2 | 8/2022 | Brauer et al. |
| 11,494,924 | B2 | 11/2022 | Noormofidi et al. |
| 11,550,309 | B2 | 1/2023 | Soltanmohammadi et al. |
| 11,551,348 | B2 | 1/2023 | Zhang et al. |
| 2003/0012442 | A1 | 1/2003 | Hashimoto et al. |
| 2004/0196453 | A1 | 10/2004 | Some |
| 2008/0165345 | A1 | 7/2008 | Hill |
| 2008/0291454 | A1 | 11/2008 | Cai et al. |
| 2009/0080759 | A1 | 3/2009 | Bhaskar et al. |
| 2010/0329540 | A1 | 12/2010 | Bhaskar et al. |
| 2012/0308112 | A1* | 12/2012 | Hu .................. G01N 23/225 |
| | | | 382/149 |
| 2015/0006103 | A1 | 1/2015 | Wel et al. |
| 2017/0116727 | A1 | 4/2017 | Kim et al. |
| 2018/0082415 | A1 | 3/2018 | Sezginer et al. |
| 2018/0144442 | A1 | 5/2018 | Brauer |
| 2019/0033728 | A1 | 1/2019 | Takagi et al. |
| 2019/0122913 | A1 | 4/2019 | Lauber et al. |
| 2019/0287232 | A1* | 9/2019 | Brauer .................. G06T 7/001 |
| 2020/0025689 | A1 | 1/2020 | Gaind et al. |
| 2020/0193588 | A1 | 6/2020 | Brauer et al. |
| 2021/0010945 | A1 | 1/2021 | Brauer et al. |
| 2021/0109041 | A1 | 4/2021 | Gaind et al. |
| 2021/0366103 | A1 | 11/2021 | Zhang et al. |
| 2021/0381989 | A1 | 12/2021 | Hiroi et al. |
| 2022/0050061 | A1 | 2/2022 | Bar |

FOREIGN PATENT DOCUMENTS

| | | |
|---|---|---|
| KR | 1020080028278 A | 3/2008 |
| KR | 1020170100710 A | 9/2017 |
| WO | 2013134068 A1 | 9/2013 |
| WO | 2019167151 A1 | 9/2019 |
| WO | 2020035285 A1 | 2/2020 |

OTHER PUBLICATIONS

Kälber et al., "U-Net based Zero-hour Defect Inspection of Electronic Components andSemiconductors," VISAPP 2021—16th International Conference on Computer Vision Theory and Applications, 2021, 9 pages, SCITEPRESS—Science and Technology Publications, Lda.

Khanmohammadi et al., "A Gaussian mixture model based discretization algorithm for associative classification of medical data," Expert Systems With Applications, Apr. 8, 2016, 11 pages, Elsevier Ltd.

Ren et al., "A Generic Deep-Learning-Based Approach for Automated Surface Inspection," IEEE Transactions on Cybernetics, 12 pages, vol. 48, No. 3, Mar. 2018, IEEE.

Ronneberger et al., "U-Net: Convolutional Networks for Biomedical Image Segmentation," May 18, 2015, 8 pages, Computer Science Department and BIOSS Centre for Biological Signalling Studies, University of Freiburg, Germany.

Salimans et al., "PixelCNN++: Improving the PixelCNN With Discretized Logistic Mixture Likelihood and Other Modifications," Conference Paper at ICLR 2017, Jan. 19, 2017, 10 pages.

Van Den Oord et al., "Conditional Image Generation with PixelCNN Decoders," Jun. 18, 2016, 13 pages.

Yamashita et al., "Convolutional neural networks: an overview and application in radiology," Insights into Imaging, Jun. 22, 2018, 19 pages, Springer Nature.

Yun et al., "Automated defect inspection system for metal surfaces based on deep learning and data augmentation," Journal of Manufacturing Systems, May 15, 2020, 8 pages, No. 55, Elsevier Ltd.

Zheng et al., "Recent advances in surface defect inspection of industrial products using deep learning techniques," Survey Paper, The International Journal of Advanced Manufacturing Technology, Jan. 25, 2021, 24 pages, Springer-Verlag London Ltd., part of Springer Nature 2021.

Korean Intellectual Property Office, International Search Report and Written Opinion for International Application No. PCT/US2023/017008, dated Jul. 31, 2023, 6 pages.

Korean Intellectual Property Office, International Search Report and Written Opinion for International Application No. PCT/US2023/017001, dated Jul. 24, 2023, 9 pages.

Korean Intellectual Property Office, International Search Report and Written Opinion for International Application No. PCT/US2023/017004, dated Jul. 12, 2023, 9 pages.

Korean Intellectual Property Office, International Search Report and Written Opinion for International Application No. PCT/US2023/017007, dated Jul. 11, 2023, 7 pages.

Hiroi et al. ("Robust Defect Detection System Using Double Reference Image Averaging for High Throughout SEM Inspection Tool," The 17th Annual SEMI/IEEE ASMC 2006 Conference; Date of Conference: May 22-24, 2006) (Year: 2006).

Kim et al. ("Improved Non-parametric Subtraction for Detection of Wafer Defect," 5th International Symposium on Image and Signal Processing and Analysis; Date of Conference: Sep. 27-29, 2007) (Year: 2007).

* cited by examiner

CONTEXT-BASED DEFECT INSPECTION

CROSS-REFERENCE TO RELATED APPLICATION

The present application claims the benefit under 35 U.S.C. § 119(e) of U.S. Provisional Application Ser. No. 63/326,268, filed Mar. 31, 2022; and U.S. Provisional Application Ser. No. 63/443,050, filed Feb. 3, 2023, both of which are incorporated herein by reference in the entirety.

TECHNICAL FIELD

The present disclosure relates generally to defect inspection and, more particularly, to context-based defect inspection.

BACKGROUND

Inspection systems are typically used in semiconductor fabrication processes to identify defects of the fabrication process that may result in performance degradation or failure of a fabricated device. Increasingly complex structures result in an increased number in parameters which must be monitored and controlled to maintain device integrity. Conventional detection techniques require considerable expertise to operate effectively. As such, with an increased number of parameters, the quality of an inspection recipe dependents greatly on the skill and experience of the operator setting it up.

There is therefore a need to develop systems and methods to address the above deficiencies.

SUMMARY

A context-based inspection system is disclosed, in accordance with one or more embodiments of the present disclosure. In embodiments, the system includes one or more controllers including one or more processors to execute program instructions stored in memory. In embodiments, the one or more program instructions are configured to cause the one or more processors to receive one or more reference images. In embodiments, the one or more program instructions are configured to cause the one or more processors to receive one or more test images of a sample, the one or more test images including one or more defects of interest (DOIs). In embodiments, the one or more program instructions are configured to cause the one or more processors to generate one or more probabilistic context maps during inspection runtime using an unsupervised classifier. In embodiments, the one or more program instructions are configured to cause the one or more processors to provide the generated one or more probabilistic context maps to a supervised classifier during the inspection runtime. In embodiments, the one or more program instructions are configured to cause the one or more processors to apply the supervised classifier to the received one or more test images to identify the one or more DOIs on the sample.

A context-based inspection system is disclosed, in accordance with one or more embodiments of the present disclosure. In embodiments, the system includes one or more controllers including one or more processors to execute program instructions stored in memory. In embodiments, the one or more program instructions are configured to cause the one or more processors to receive empirical data acquired from a sample from a characterization sub-system. In embodiments, the one or more program instructions are configured to cause the one or more processors to receive design decomposition data from a design decomposition database. In embodiments, the one or more program instructions are configured to cause the one or more processors to generate one or more probabilistic context maps based on the received empirical data and the received data from the design database prior to inspection runtime. In embodiments, the one or more program instructions are configured to cause the one or more processors to store the generated one or more probabilistic context maps in the memory. In embodiments, the one or more program instructions are configured to cause the one or more processors to receive one or more reference images. In embodiments, the one or more program instructions are configured to cause the one or more processors to receive one or more test images of the sample, the one or more test images including one or more defects of interest (DOIs). In embodiments, the one or more program instructions are configured to cause the one or more processors to retrieve the stored one or more probabilistic context maps from the memory. In embodiments, the one or more program instructions are configured to cause the one or more processors to provide the one or more probabilistic context maps to a supervised classifier. In embodiments, the one or more program instructions are configured to cause the one or more processors to apply the supervised classifier to the received one or more test images to identify the one or more DOIs on the sample.

A system is disclosed, in accordance with one or more embodiments of the present disclosure. In embodiments, the system includes an optical imaging sub-system. In embodiments, the system includes one or more controllers communicatively coupled to the optical imaging sub-system. In embodiments, the one or more controllers include one or more processors to execute program instructions stored in memory. In embodiments, the one or more program instructions are configured to cause the one or more processors to receive empirical data acquired from a sample from a characterization sub-system. In embodiments, the one or more program instructions are configured to cause the one or more processors to receive design decomposition data from a design decomposition database. In embodiments, the one or more program instructions are configured to cause the one or more processors to generate one or more probabilistic context maps based on the received empirical data and the received data from the design database prior to inspection runtime. In embodiments, the one or more program instructions are configured to cause the one or more processors to store the generated one or more probabilistic context maps in the memory. In embodiments, the one or more program instructions are configured to cause the one or more processors to receive one or more reference images. In embodiments, the one or more program instructions are configured to cause the one or more processors to receive one or more test images of the sample, the one or more test images including one or more defects of interest (DOIs). In embodiments, the one or more program instructions are configured to cause the one or more processors to retrieve the stored one or more probabilistic context maps from the memory. In embodiments, the one or more program instructions are configured to cause the one or more processors to provide the one or more probabilistic context maps to a supervised classifier. In embodiments, the one or more program instructions are configured to cause the one or more processors to apply the trained supervised classifier to the received one or more test images to identify the one or more DOIs on the sample.

A context-based inspection system is disclosed, in accordance with one or more embodiments of the present disclosure. In embodiments, the system includes one or more controllers including one or more processors to execute program instructions stored in memory. In embodiments, the one or more program instructions are configured to cause the one or more processors to receive empirical data from a characterization sub-system. In embodiments, the one or more program instructions are configured to cause the one or more processors to generate one or more context maps based on the received empirical data prior to inspection runtime. In embodiments, the one or more program instructions are configured to cause the one or more processors to train a supervised classifier based on the generated one or more context maps and a set of labeled training images. In embodiments, the one or more program instructions are configured to cause the one or more processors to receive one or more reference images. In embodiments, the one or more program instructions are configured to cause the one or more processors to receive one or more test images of a sample, the one or more test images including one or more defects of interest (DOIs). In embodiments, the one or more program instructions are configured to cause the one or more processors to apply the trained supervised classifier to the received one or more test images to identify the one or more DOIs on the sample.

A system is disclosed, in accordance with one or more embodiments of the present disclosure. In embodiments, the system includes an optical imaging sub-system. In embodiments, the system includes one or more controllers communicatively coupled to the optical imaging sub-system. In embodiments, the one or more controllers include one or more processors to execute program instructions stored in memory. In embodiments, the one or more program instructions are configured to cause the one or more processors to receive empirical data from a characterization sub-system. In embodiments, the one or more program instructions are configured to cause the one or more processors to generate one or more context maps based on the received empirical data prior to inspection runtime. In embodiments, the one or more program instructions are configured to cause the one or more processors to train a supervised classifier based on the generated one or more context maps and a set of labeled training images. In embodiments, the one or more program instructions are configured to cause the one or more processors to receive one or more reference images. In embodiments, the one or more program instructions are configured to cause the one or more processors to receive one or more test images of a sample, the one or more test images including one or more defects of interest (DOIs). In embodiments, the one or more program instructions are configured to cause the one or more processors to apply the trained supervised classifier to the received one or more test images to identify the one or more DOIs on the sample.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for context-based defect inspection.

Semiconductor devices are typically fabricated using a series of process steps such as, but not limited to, deposition of process layers and/or photoresists, photoresist exposure with a desired pattern, etching of the photoresist and/or underlying process layers, polishing, or the like. Variations of any of these processes, alone or in combination, may lead to variations of fabricated sample features. In a general sense, some sample variations may be acceptable and are deemed nuisances, while others may result in unacceptable performance degradation or device failure and are deemed defects of interest (DOIs).

Inspection tools may be used to inspect a sample for defects after selected process steps. For example, an inspection tool may generate an inspection image of a sample after a particular process step. Such an inspection image is then typically compared to a reference image to identify defects, where the defects are related to differences between the inspection and reference images. For example, the reference image may be subtracted from the inspection image to generate a difference image, where features in the difference image correspond to sample variations. These sample variations may then be classified as DOIs or nuisances. While various types of inspection tools have been developed, optical inspection tools that generate an image based on illumination with a light source are commonly used for in-line inspection due to the relatively high throughput.

Some embodiments of the present disclosure are directed to methods for developing an inspection recipe for optical inspection based on context data. For example, developing an inspection recipe may include, but is not limited to, generating context maps, as will be discussed further. Inspection recipe generation is generally discussed in U.S. Pat. No. 7,877,722, entitled Systems and methods for creating inspection recipes, issued on Jan. 25, 2011; U.S. Pat. No. 8,126,255, entitled Systems and methods for creating persistent data for a wafer and for using persistent data for inspection-related functions, issued on Feb. 28, 2012; U.S. Pat. No. 8,611,639, entitled Semiconductor device property extraction, generation, visualization, and monitoring methods, issued on Dec. 17, 2013; and U.S. Pat. No. 9,262,821, entitled Inspection recipe setup from reference image variation, issued on Feb. 16, 2016, which are each incorporated herein by reference in the entirety.

More particularly, embodiments of the present disclosure are directed to systems and methods for generating sample-specific context maps that may be generated using sample-dependent context data (i.e. data related to the sample being inspected), where the generated sample-specific pixel level probability context maps may be fed to a supervised classifier that serves as the primary detection mechanism for detecting DOIs. In this regard, the sample-specific context map may be an added channel to the primary detection stage (e.g., supervised classifier) based on data acquired from the sample being inspection to improve sensitivity, reduce the sample size, and mitigate the risk of missing novel defect types that are not comprehended by a single detection mechanism (e.g., deep learning model). Defect detection using machine learning is generally discussed in U.S. Pat. No. 11,551,348, entitled Learnable defect detection for semiconductor applications, issued on Jan. 10, 2023; and U.S. Pat. No. 10,346,740, entitled Systems and methods incorporating a neural network and a forward physical model for semiconductor applications, issued on Jul. 9, 2019, both of which are incorporated herein by reference in the entirety.

Some embodiments of the present disclosure are directed to systems and methods for generating in-situ sample-specific context maps during inspection runtime, where the in-situ sample-specific context maps are fed to the supervised classifier. For example, the in-situ sample specific context map may be generated using at least an unsupervised classifier.

Any suitable unsupervised classifier may be used within the spirit and scope of the present disclosure. In some embodiments, the unsupervised classifier includes a neural network (e.g., an unsupervised neural network). For example, a neural network may generate probabilities that each pixel may be classified in background and defect classes. In this way, the output of the neural network may be substantially of the same type as other techniques (e.g., soft clustering based on point clouds, or the like). In some embodiments, the unsupervised classifier includes a soft clustering technique such as, but not limited to, Gaussian mixtures modeling. For example, a point cloud may be generated using the inspection images, where the soft clustering technique generates probabilities that each pixel (or associated location on the sample of interest) may be classified in a particular class (e.g., background or defect).

Some embodiments of the present disclosure are directed to systems and methods for generating ex-situ sample-specific context maps prior to inspection runtime, where the ex-situ sample-specific context maps are stored prior to runtime and then fed to the supervised classifier during inspection runtime. For example, the ex-situ context maps may be generated prior to inspection based on a database and empirical data obtained from the sample to be inspected.

Any suitable database may be used within the spirit and scope of the present disclosure. In some embodiments, the database includes a geometric pattern centric database including the behavior of product specific patterns conditioned on process metrology data (e.g., lithography focus, lithography dose, critical dimensions, overlay, and the like). In some embodiments, the database includes a patterning simulation database including pattern shape probabilities conditioned on process conditions.

Some embodiments of the present disclosure are directed to systems and methods for generating context maps that may be used to train a supervised classifier. For example, the context maps may be generated prior to inspection runtime based on empirical data and used to train a supervised classifier, where the supervised classifier may be configured to perform primary detection based on the generated context maps. For instance, the sample-specific context map may be generated based on sample-dependent context data from a metrology tool, an inspection tool, or a process tool. In this regard, the supervised classifier may be trained using the generated context maps until the supervised classifier is sufficiently trained for defect detection for a sample not included in the training process.

Any suitable metrology tool may be used within the spirit and scope of the present disclosure. In some embodiments, the metrology tool includes, but is not limited to, an optical metrology tool, an electron beam (e-beam) metrology tool, an x-ray based metrology tool, a spectroscopy-based metrology tool, or the like.

Any suitable inspection tool may be used within the spirit and scope of the present disclosure. In some embodiments, the inspection tool includes an image-based inspection tool.

For example, the image-based inspection tool may include the same inspection tool used to perform the context-based inspection.

Any suitable process tool may be used within the spirit and scope of the present disclosure. In some embodiments, the process tool includes a scanner.

Referring now to FIGS. 1A-7, systems and methods for context-based inspection are described in greater detail, in accordance with one or more embodiments of the present disclosure.

Figure 1A:
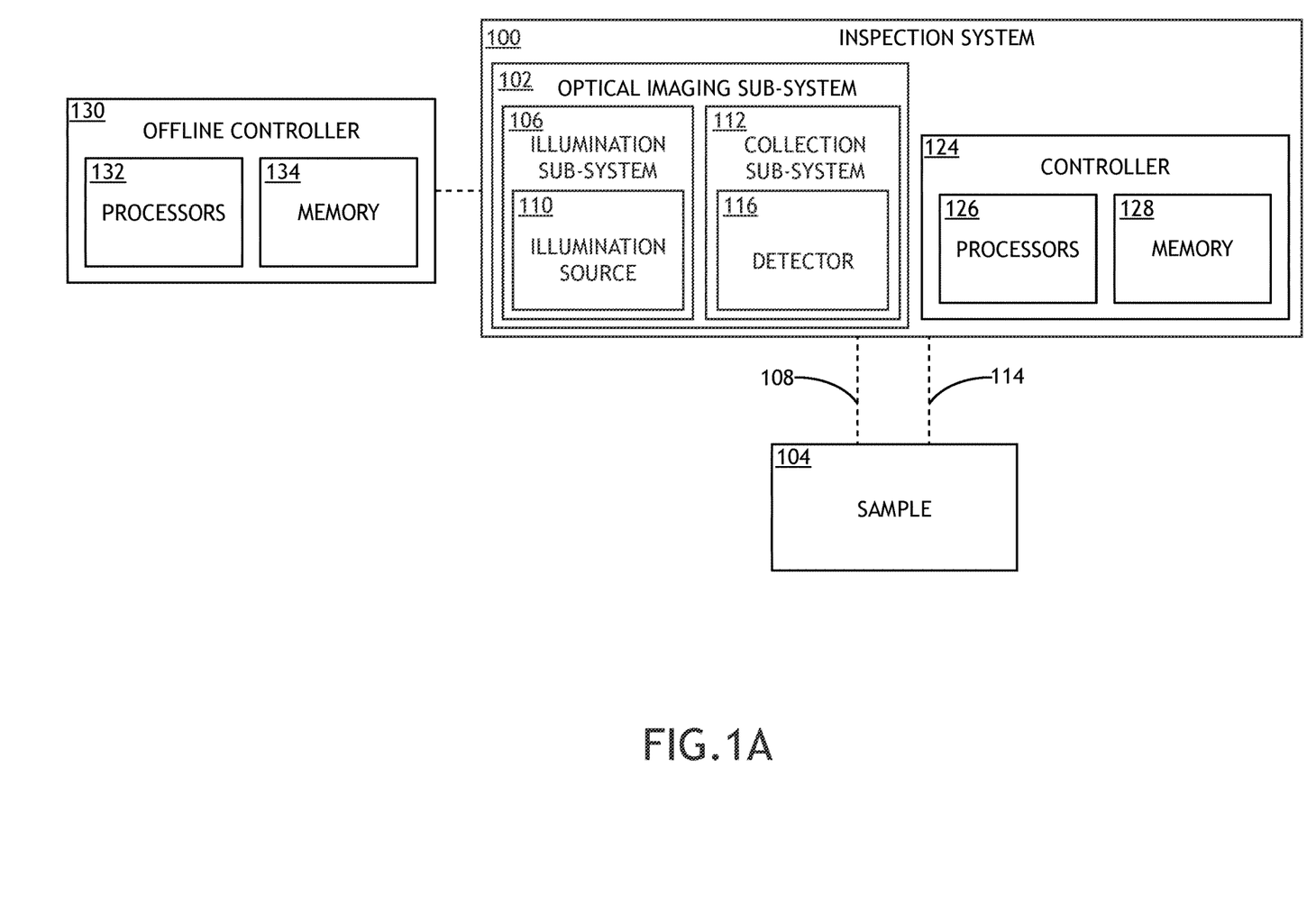
FIG. 1A illustrates a simplified block diagram of a system for context-based inspection, in accordance with one or more embodiments of the present disclosure.

FIG. 1A is a block diagram of a context-based inspection system 100, in accordance with one or more embodiments of the present disclosure.

In embodiments, the inspection system 100 includes one or more optical imaging sub-systems 102 (e.g., optical imaging tools) configured to generate one or more images of a sample 104, where the one or more optical imaging sub-systems 102 may be configurable to image the sample 104. For example, an optical imaging sub-system 102 may include an illumination sub-system 106 configured to illuminate the sample 104 with illumination 108 from an illumination source 110 and a collection sub-system 112 configured to generate an image of the sample 104 in response to light emanating from the sample (e.g., sample light 114) using a detector 116.

The sample 104 may include a substrate formed of a semiconductor or non-semiconductor material (e.g., a wafer, or the like). For example, a semiconductor or non-semiconductor material may include, but is not limited to, monocrystalline silicon, gallium arsenide, and indium phosphide. The sample may further include a mask, a lens (e.g., a metalens), a reticle, or the like formed of a semiconductor or non-semiconductor material. The sample 104 may further include one or more layers disposed on the substrate. For example, such layers may include, but are not limited to, a resist, a dielectric material, a conductive material, and a semiconductive material. Many different types of such layers are known in the art, and the term sample as used herein is intended to encompass a sample on which all types of such layers may be formed. One or more layers formed on a sample may be patterned or unpatterned. For example, a sample may include a plurality of dies, each having repeatable patterned features. Formation and processing of such layers of material may ultimately result in completed devices. Many different types of devices may be formed on a sample, and the term sample as used herein is intended to encompass a sample on which any type of device known in the art is being fabricated.

Figure 1B:
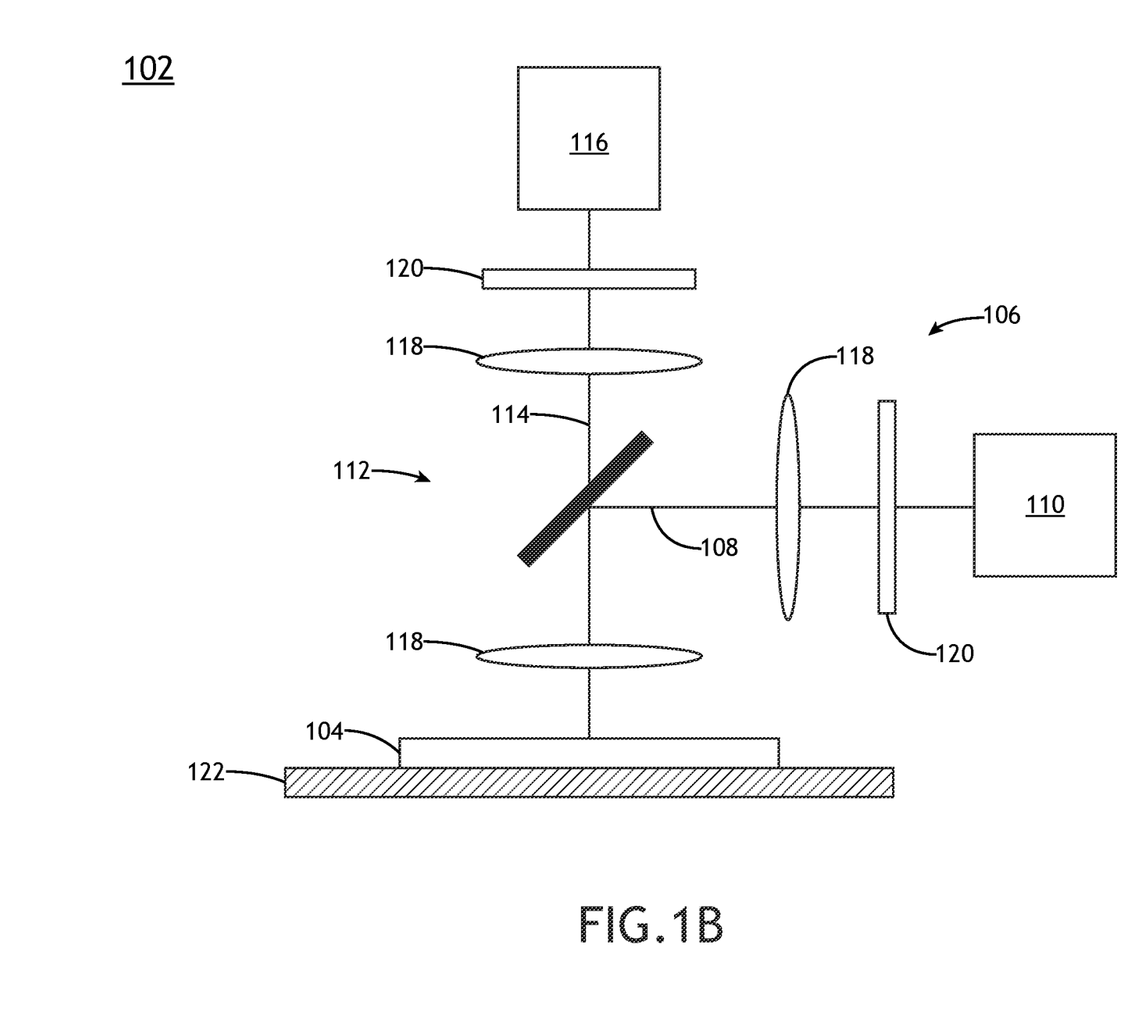
FIG. 1B illustrates a simplified schematic of an image-based inspection system, in accordance with one or more embodiments of the present disclosure.

The optical imaging sub-system 102 may generate one or more images of the sample 104 using any technique known in the art. In some embodiments, the optical imaging sub-system 102 is an optical imaging sub-system 102, where the illumination source 110 is an optical source configured to generate illumination 108 in the form of light, and where the collection sub-system 112 images the sample 104 based on light emanating from the sample 104. FIG. 1B is a simplified schematic view of an optical inspection system 100, in accordance with one or more embodiments of the present disclosure.

The illumination source 110 may include any type of illumination source known in the art suitable for generating an optical illumination 108, which may be in the form of one or more illumination beams. Further, the illumination 108 may have any spectrum such as, but not limited to, extreme ultraviolet (EUV) wavelengths, ultraviolet (UV) wavelengths, visible wavelengths, or infrared (IR) wavelengths. Further, the illumination source 110 may be a broadband source, a narrowband source, and/or a tunable source.

In embodiments, the illumination source 110 includes a broadband plasma (BBP) illumination source. In this regard, the illumination 108 may include radiation emitted by a plasma. For example, a BBP illumination source 110 may include, but is not required to include, one or more pump sources (e.g., one or more lasers) configured to focus into the volume of a gas, causing energy to be absorbed by the gas in order to generate or sustain a plasma suitable for emitting radiation. Further, at least a portion of the plasma radiation may be utilized as the illumination 108.

In embodiments, the illumination source 110 may include one or more lasers. For instance, the illumination source 110 may include any laser system known in the art capable of emitting radiation in the infrared, visible, or ultraviolet portions of the electromagnetic spectrum.

The illumination source 110 may further produce illumination 108 having any temporal profile. For example, the illumination source 110 may produce continuous-wave (CW) illumination 108, pulsed illumination 108, or modulated illumination 108. Additionally, the illumination 108 may be delivered from the illumination source 110 via free-space propagation or guided light (e.g., an optical fiber, a light pipe, or the like).

The illumination sub-system 106 and/or the optical imaging sub-system 102 may include various components to direct the illumination 108 to the sample 104 such as, but not limited to, lenses 118, mirrors, or the like. Further, such components may be reflective elements or transmissive elements. In this way, the depiction of the lenses 118 in FIG. 1B as transmissive elements is merely illustrative and not limiting. The illumination sub-system 106 may further include one or more optical elements 120 to modify and/or condition light in the associated optical path such as, but not limited to, one or more polarizers, one or more filters, one or more beam splitters, one or more diffusers, one or more homogenizers, one or more apodizers, or one or more beam shapers.

In embodiments, the inspection system 100 includes a translation stage 122 for securing and/or positioning the sample 104 during imaging. For example, the translation stage 122 may include any combination of linear actuators, rotational actuators, or angle actuators to position the sample 104 using any number of degrees of freedom.

The optical imaging sub-system 102 may include various components to collect at least a portion of the sample light 114 and direct at least a portion of the sample light 114 to a detector 116 for generation of an image.

The inspection system 100 may further image the sample 104 using any technique known in the art. In some embodiments, the inspection system 100 generates an image of the sample 104 in a scanning mode by focusing the illumination 108 onto the sample 104 as a spot or a line, capturing a point or line image, and scanning the sample 104 to build up a two-dimensional image. In this configuration, scanning may be achieved by moving the sample 104 with respect to the illumination 108 (e.g., using the translation stage 122), by moving the illumination 108 with respect to the sample 104 (e.g., using actuatable mirrors, or the like), or a combination thereof. In some embodiments, the inspection system 100 generates an image of the sample 104 in a static mode by directing the illumination 108 to the sample 104 in a two-dimensional field of view and capturing an two-dimensional image directly with the detector 116.

An image generated by the inspection system 100 may be any type of image known in the art such as, but not limited to, a brightfield image, a darkfield image, a phase-contrast image, or the like. Further, images may be stitched together to form a composite image of the sample 104 or a portion thereof.

The detector 116 may include any type of sensor known in the art suitable for measuring sample light 114. For example, a detector 116 may include a multi-pixel sensor such as, but not limited to, a charge-couple device (CCD), a complementary metal-oxide-semiconductor (CMOS) device, a line sensor, or a time-delay-integration (TDI) sensor. As another example, a detector 116 may include two or more single-pixel sensors such as, but not limited to, a photodiode, an avalanche photodiode, a photomultiplier tube, or a single-photon detector.

In embodiments, the inspection system 100 includes a controller 124. The controller 124 may include one or more processors 126 configured to execute program instructions maintained on a memory 128 (e.g., a memory medium). In this regard, the one or more processors 126 of controller 124 may execute any of the various process steps described throughout the present disclosure.

Referring again to FIG. 1A, in embodiments, the context-based inspection system 100 may be communicatively coupled to an offline controller 130. The offline controller 130 may include one or more processors 132 configured to execute program instructions maintained on a memory 134 (e.g., a memory medium). In this regard, the one or more processors 132 of controller 130 may execute any of the various process steps described throughout the present disclosure. For example, as will be described further herein, the offline controller 130 may be configured to generate one or more context maps. By way of another example, the offline controller 130 may be configured to train a supervised classifier stored in memory 134 based on generated context maps.

The one or more processors 126, 132 of a controller 124, 130 may include any processing element known in the art. In this sense, the one or more processors 126, 132 may include any microprocessor-type device configured to execute algorithms and/or instructions. In one embodiment, the one or more processors 126 may consist of a desktop computer, mainframe computer system, workstation, image computer, parallel processor, or any other computer system (e.g., networked computer) configured to execute a program configured to operate the inspection system 100, as described throughout the present disclosure. It is further recognized that the term "processor" may be broadly defined to encompass any device having one or more processing elements, which execute program instructions from a non-transitory memory 128, 134.

The memory 128, 134 may include any storage medium known in the art suitable for storing program instructions executable by the associated one or more processors 126, 132. For example, the memory 128, 134 may include a non-transitory memory medium. By way of another example, the memory 128, 134 may include, but is not limited to, a read-only memory, a random access memory, a magnetic or optical memory device (e.g., disk), a magnetic tape, a solid state drive and the like. It is further noted that memory 128 may be housed in a common controller housing with the one or more processors 126. In one embodiment, the memory 128, 134 may be located remotely with respect to the physical location of the one or more processors 126, 132 and controller 124, 130. For instance, the one or more processors 126, 132 of controller 124, 130 may access a remote memory (e.g., server), accessible through a network (e.g., internet, intranet and the like). Therefore, the above description should not be interpreted as a limitation on the present invention but merely an illustration.

Figure 2:
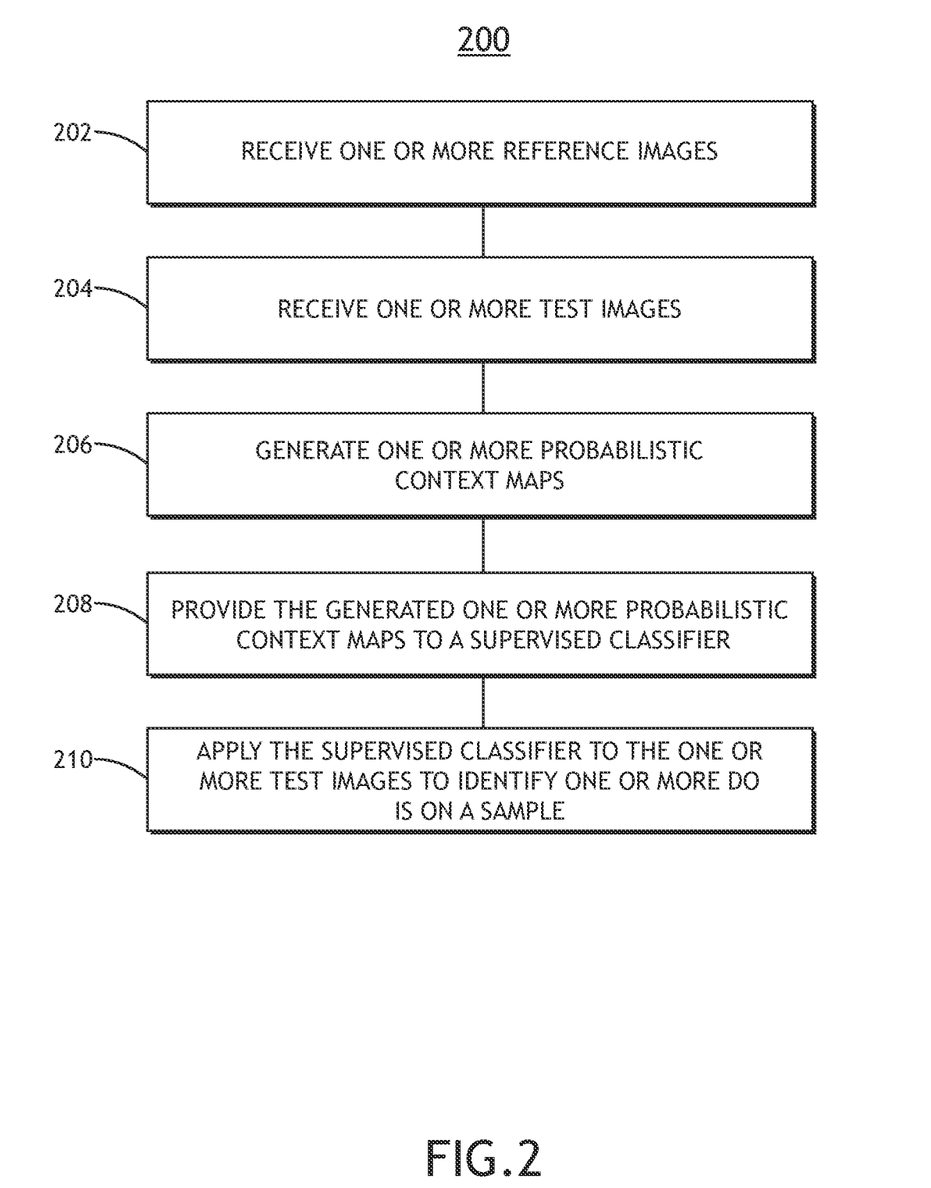
FIG. 2 illustrates a flowchart depicting a method for performing context-based inspection using an in-situ generated probabilistic context map, in accordance with one or more embodiments of the present disclosure.

FIG. 2 illustrates a flowchart depicting a method 200 for performing context-based inspection using an in-situ generated probabilistic context map, in accordance with one or more embodiments of the present disclosure. Applicant notes that the embodiments and enabling technologies described previously herein in the context of the inspection system 100 should be interpreted to extend to the method 200. It is further noted, however, that the method 200 is not limited to the architecture of the inspection system 100.

In a step 202, one or more reference images may be received. For example, the controller 124 may be configured to receive one or more reference images from the optical imaging sub-system 102. By way of another example, the controller 124 may be configured to receive one or more reference images from an additional optical imaging sub-system.

The one or more reference images may represent an ideal or reference. Such a reference image may be generated using any suitable technique. For example, a reference image may be generated using a single image of a reference region with a common design as the test region and known or expected to be free of defects. By way of another example, a reference image may be generated by combining (e.g., averaging, or the like) multiple images of multiple reference regions.

In a step 204, one or more test images may be received. For example, the controller 124 may be configured to receive one or more test images from the optical imaging sub-system 102. The one or more test images may include various patterned features on the sample. In some embodiments, the one or more test images include one or more DOIs.

In a step 206, one or more in-situ probabilistic context maps are generated. For example, during inspection runtime, the controller 124 may be configured to generate the one or more in-situ probabilistic maps.

Figure 3:
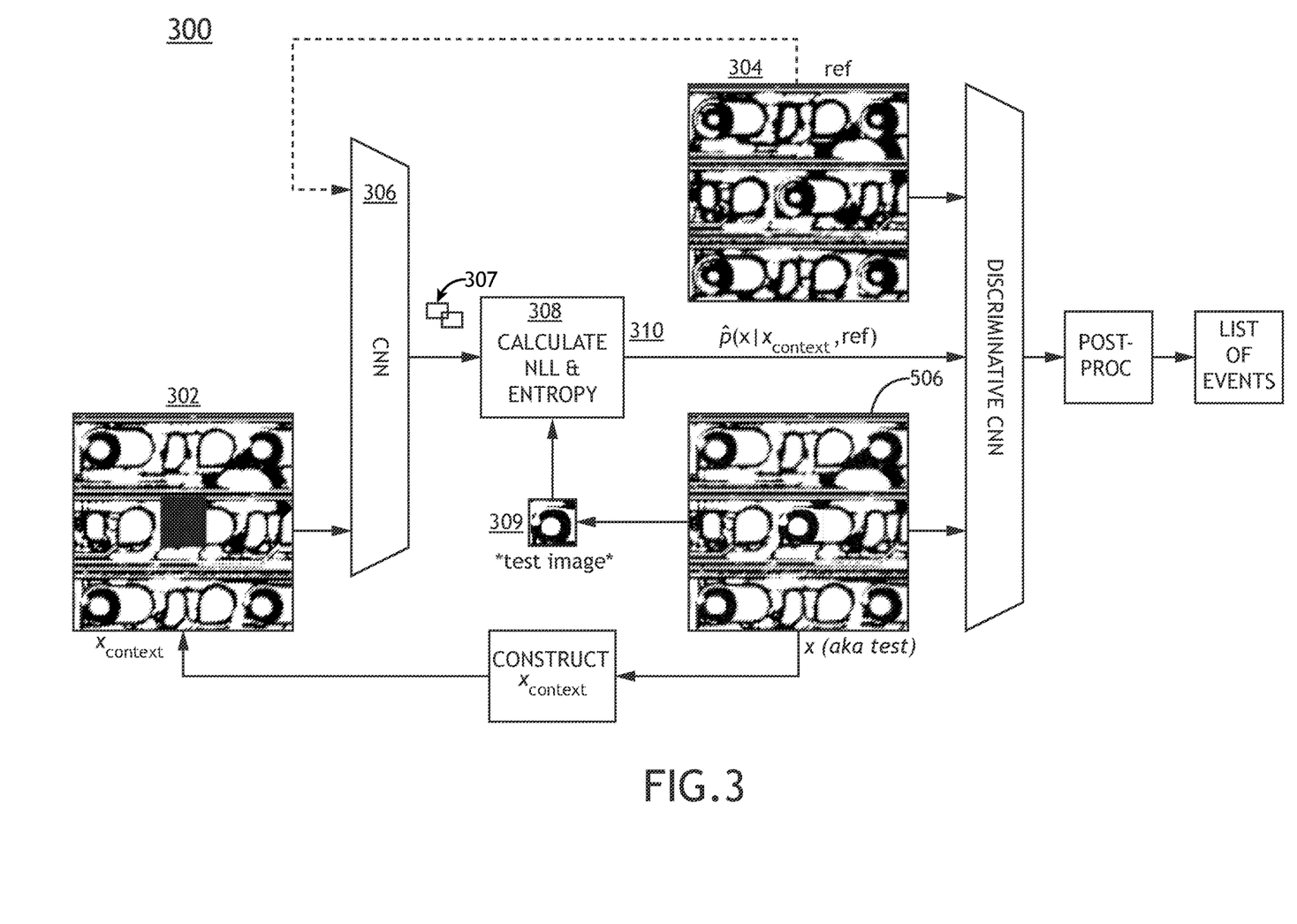
FIG. 3 illustrates a process flow diagram depicting a method of performing context-based inspection using the in-situ generated probabilistic context map, in accordance with one or more embodiments of the present disclosure.

FIG. 3 illustrates a process flow diagram depicting the method 300 for generating the one or more in-situ generated probabilistic context maps, in accordance with one or more embodiments of the present disclosure.

In a step 302, target context data may be generated based on the received test images and provided to an unsupervised classifier. For example, the controller 124 may be configured to perform input shifting to generate the target context data based on the received test images. For instance, the controller 124 may be configured to remove a portion from the received test image, where the removed portion may correspond to a defect on the test image.

In an optional step 304, the reference images may be provided to the unsupervised classifier.

In a step 306, one or more generated reference images may be generated using the unsupervised classifier.

For example, the controller 124, using the unsupervised classifier, may be configured to generate one or more generated reference images 307. For purposes of the present disclosure, the "generated reference images" of step 306 are different than the reference images received in step 202, unless otherwise noted herein.

In embodiments, the unsupervised classifier is configured to generate one or more generated reference images (i.e., "TestRef" images) based on the target context data (from step 302) and, in some cases, the received reference image (from an optional step 304). For example, the unsupervised classifier may output Gaussian mixture model (GMM) parameters for intensity of the generated reference images ("TestRef" images) to be compared with actual observed pixels 309 from the received test image from step 204 ("TestActual" images).

In a step 308, an entropy score and negative log-likelihood (NLL) score may be calculated. For example, the entropy score may be calculated as the expected negative log-likelihood (NLL) per pixel, which may be calculated by integrating over all possible intensity values for the given pixel's GMM parameters.

The negative log-likelihood (NLL) score may be calculated by comparing the generated test reference image from the unsupervised classifier ("TestRef") and the test actual image ("TestActual"). For example, the controller 124 may be configured to calculate the NLL score based on the context data and reference image, as shown and described by Equation 1:

$$NLL = -\text{Log } \hat{p}(x|x_{context}, r) \quad (1)$$

where $\hat{p}(x|x_{context}, r)$ is the parametric probability density given hints: target context and reference images. The expectation maximization algorithm may then adjust the parameters of the probability model to maximize the NLL for the associated data given the hints: target context and reference images.

In a step 310, the generated one or more probabilistic context maps (or score maps) 311 may be generated based on the entropy score and NLL score. For example, the entropy score from step 308 may be used to normalize the NLL score by subtracting off the expected valued to generate the one or more probabilistic context maps (or score maps).

Referring back to FIG. 2, in a step 208, the generated one or more probabilistic context maps may be provided to the supervised classifier. For example, the controller 124 may be configured to provide the generated one or more probabilistic context maps (or score maps) to the supervised classifier during inspection runtime. It is noted that the context maps (or score maps) which are fed to the supervised classifier are a measure of defectiveness. The hint provided by the score map reduces the size of the labeled training data required for entitlement by greater than two orders of magnitude, as the burden of weeding out the vast majority of normal variation is already performed.

The supervised classifier may include any type of deep learning classifier or algorithm including, but not limited to, a deep convolutional neural network (CNN), or the like. For example, the supervised classifier may include a supervised discriminative CNN.

In the context of supervised learning, training images may include images of false positives or true negatives. The controller 124 may be further configured to store the training images and the supervised classifier in memory 128.

In a step 210, the supervised classifier may be applied to the one or more test images to identify the one or more DOIs on the sample. For example, the controller 124, using the supervised classifier, may be configured to identify one or more DOIs on the sample 104.

Figure 4:
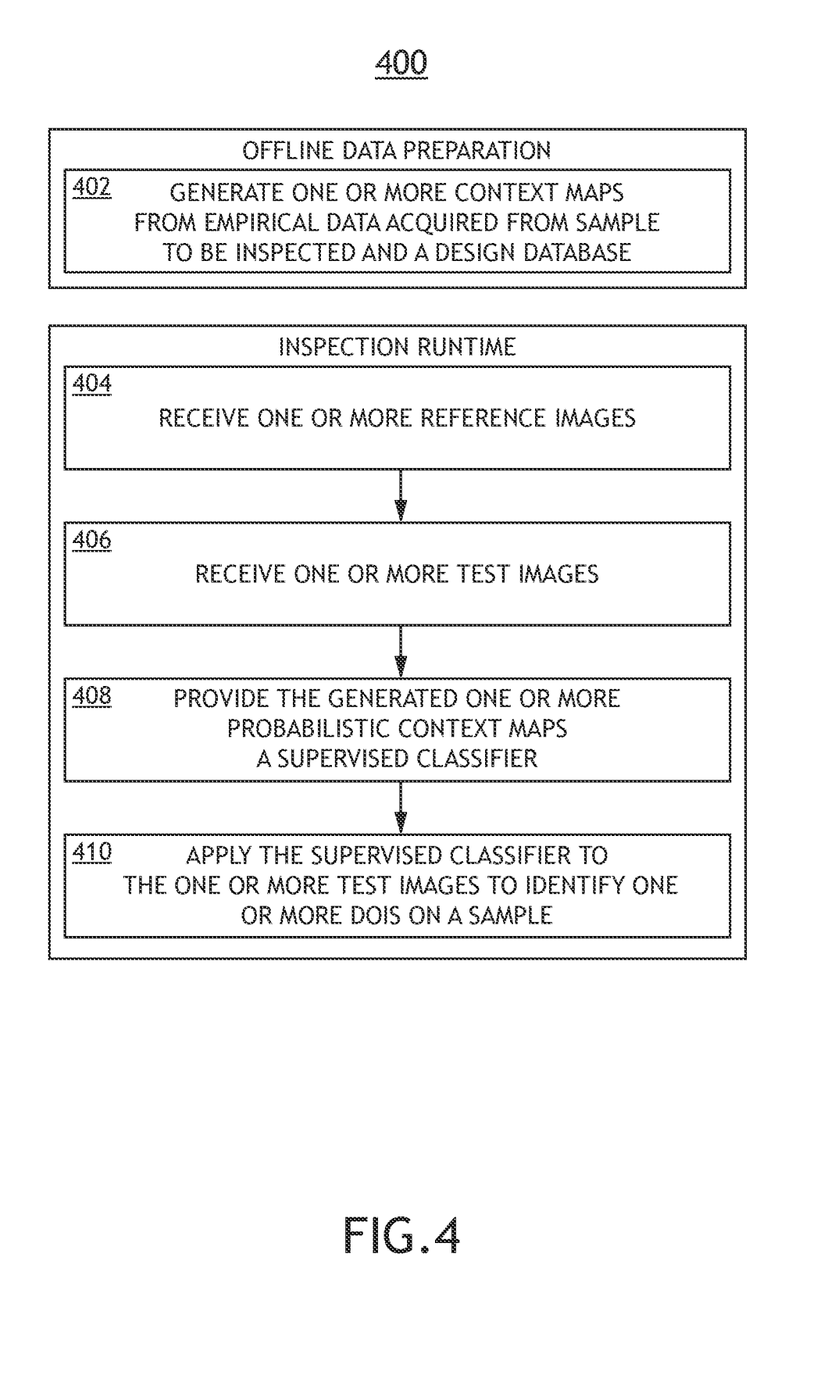
FIG. 4 illustrates a flowchart depicting a method for performing context-based inspection using an ex-situ generated probabilistic context map, in accordance with one or more embodiments of the present disclosure.

FIG. 4 illustrates a flowchart depicting a method 400 for performing context-based inspection using ex-situ generated probabilistic context maps, in accordance with one or more embodiments of the present disclosure. Applicant notes that the embodiments and enabling technologies described previously herein in the context of the inspection system 100 should be interpreted to extend to the method 400. It is further noted, however, that the method 400 is not limited to the architecture of the inspection system 100.

In a step 402, prior to inspection runtime, one or more probabilistic context maps may be generated. For example, the controller 124, prior to inspection runtime, may be configured to generate one or more probabilistic context maps based on empirical data acquired from a sample to be inspected. In this regard, the controller 124 may be configured to store the one or more probabilistic context maps in memory prior to inspection and provide the generated probabilistic maps to a supervised classifier during runtime to the supervised classifier (as will be discussed further herein).

Figure 5:
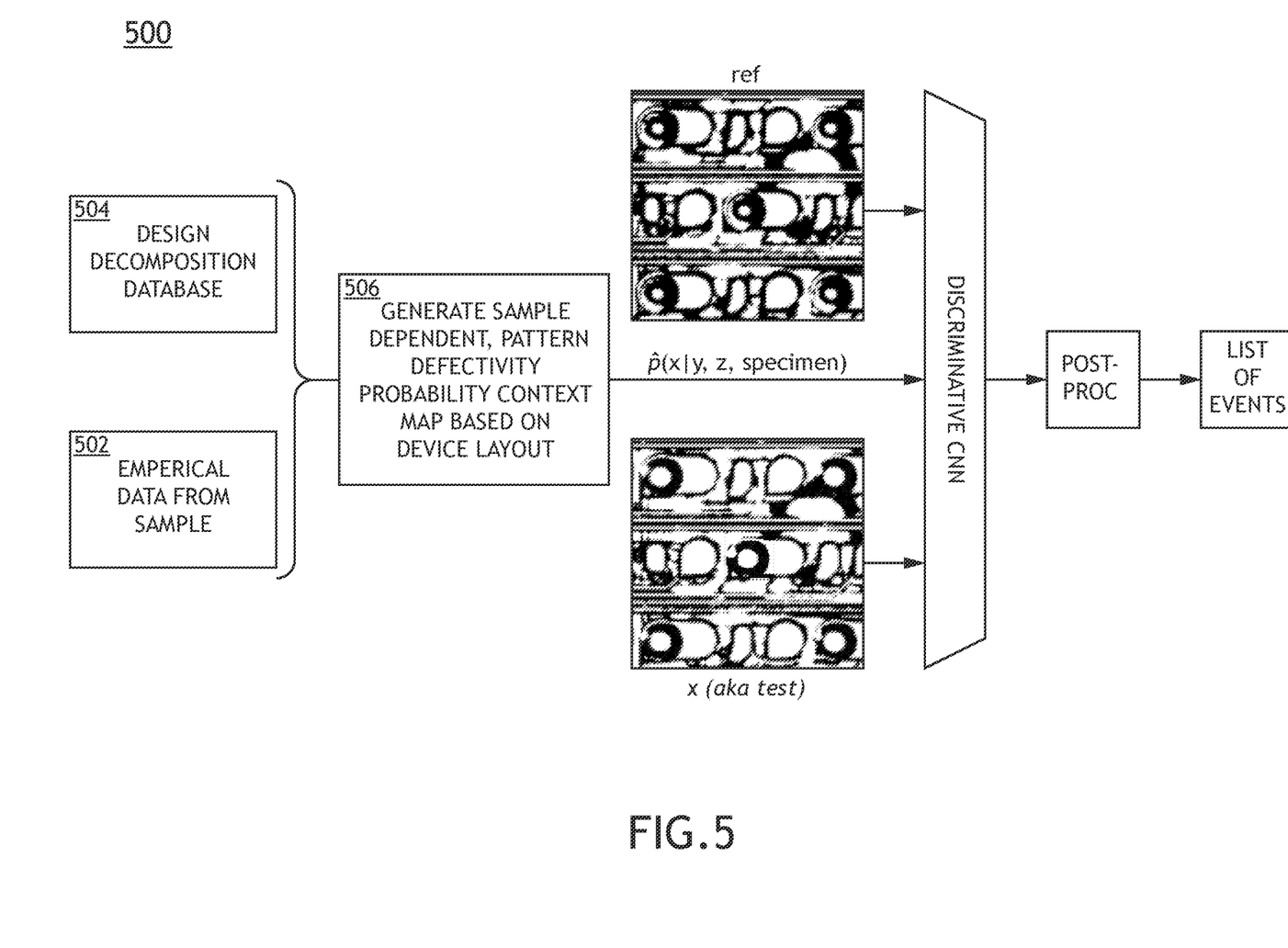
FIG. 5 illustrates a process flow diagram depicting a method of performing context-based inspection using the ex-situ generated probabilistic context map, in accordance with one or more embodiments of the present disclosure.

FIG. 5 illustrates a process flow diagram depicting a method 500 for generating the probabilistic context maps prior to inspection, in accordance with one or more embodiments of the present disclosure.

For example, the one or more probabilistic context maps may indicate the parametric probability density given empirical data (y), sample-dependent context data (z), and design data as expressed by $\hat{p}(x|y, z, \text{specimen})$, where the empirical data (y) indicates the probability density given sample-context data (z) for a given pattern as expressed by $y = \hat{p}(\text{defect}|z)$.

In a step 502, data from the sample to be expected may be received. For example, the controller 124 may be configured to receive metrology data from a metrology tool. The metrology tool may include, but is not limited to, an optical metrology tool, an electron beam (e-beam) metrology tool, an x-ray based metrology tool, a spectroscopy-based metrology tool, or the like. The metrology data may include, but is not limited to, critical dimensions, overlay, film thickness, pattern profile, and like.

In a step 504, data from a design decomposition database may be received. For example, the controller 124 may be configured to receive data from a design decomposition database that embodies the primitive patterns by location that are included in the design of the sample being inspected along with the predicted behavior of the primitive patterns as a function of some measured characteristics of the sample which are embodied in. In one instance, the design decomposition database may be segmented into one database for location of the primitive patterns. In another instance, the database may be segmented into a separate database that embodies the predicted behavior.

Design decomposition databases are generally discussed in U.S. Pat. No. 9,183,624, entitled Detecting defects on a wafer with run time use of design data, issued on Nov. 10, 2015, which is incorporated herein by reference in the entirety.

In a step 506, the one or more probabilistic context maps (or score maps) are generated based on the received data from steps 502-504 and stored in memory. For example, the one or more probabilistic context maps are generated prior to inspection and provided to the optical imaging sub-system 102 during runtime. For instance, the offline controller 130 may be configured to generate the one or more probabilistic context maps and store the generated one or more probabilistic context maps in memory 134 (or a remote database) and provide the stored one or more probabilistic context maps 136 to the context-based inspection system 100 during runtime.

Referring back to FIG. 4, in a step 404, one or more reference images may be received. For example, the controller 124 may be configured to receive one or more reference images from the optical imaging sub-system 102. The one or more reference images may represent an ideal or reference. Such a reference image may be generated using any suitable technique. For example, a reference image may be generated using a single image of a reference region with a common design as the test region and known or expected to be free of defects. By way of another example, a reference image may be generated by combining (e.g., averaging, or the like) multiple images of multiple reference regions.

In a step 406, one or more test images may be received. For example, the controller 124 may be configured to receive one or more test images from the optical imaging sub-system 102.

The one or more test images may include various patterned features on the sample. In some embodiments, the one or more test images include one or more DOIs.

In a step 408, the generated one or more probabilistic context maps may be provided to a supervised classifier. For example, the offline controller 130 may be configured to provide the one or more generated probabilistic context maps 136 stored in memory 134 to the supervised classifier.

The supervised classifier may include any type of deep learning classifier or algorithm including, but not limited to, a deep convolutional neural network (CNN), or the like. For example, the supervised classifier may include a supervised discriminative CNN.

In the context of supervised learning, training images may include images of false positives or true negatives. The offline controller 130 may be further configured to store the training images in memory 134 and the controller 124 may be configured to store the trained supervised classifier in memory 128.

In a step 410, the supervised classifier may be applied to the one or more test images to identify the one or more DOIs on the sample. For example, the controller 124, using the supervised classifier, may be configured to identify one or more DOIs on the sample 104.

Figure 6:
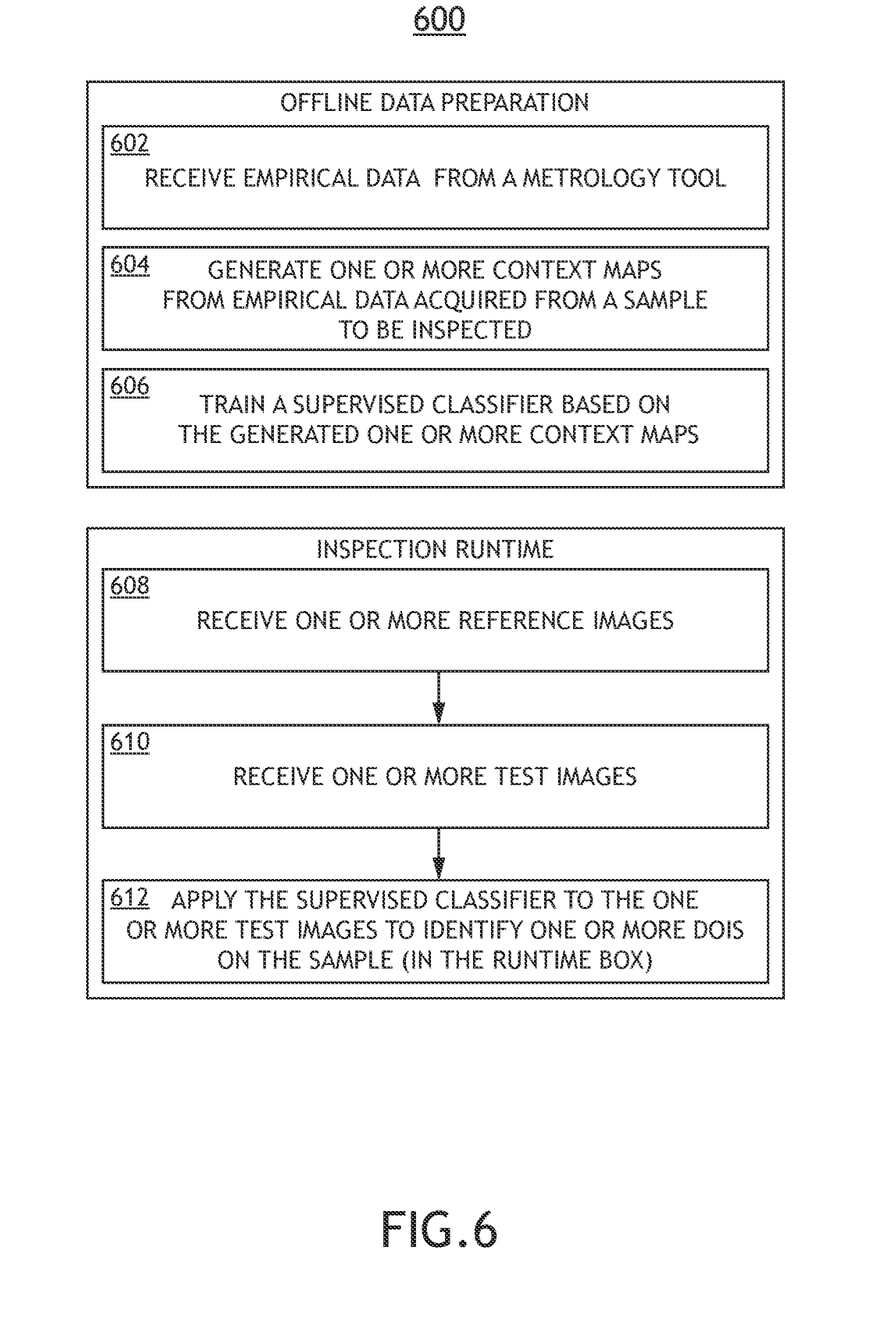
FIG. 6 illustrates a flowchart depicting a method for performing context-based inspection using a generated training context map, in accordance with one or more embodiments of the present disclosure.
Figure 7:
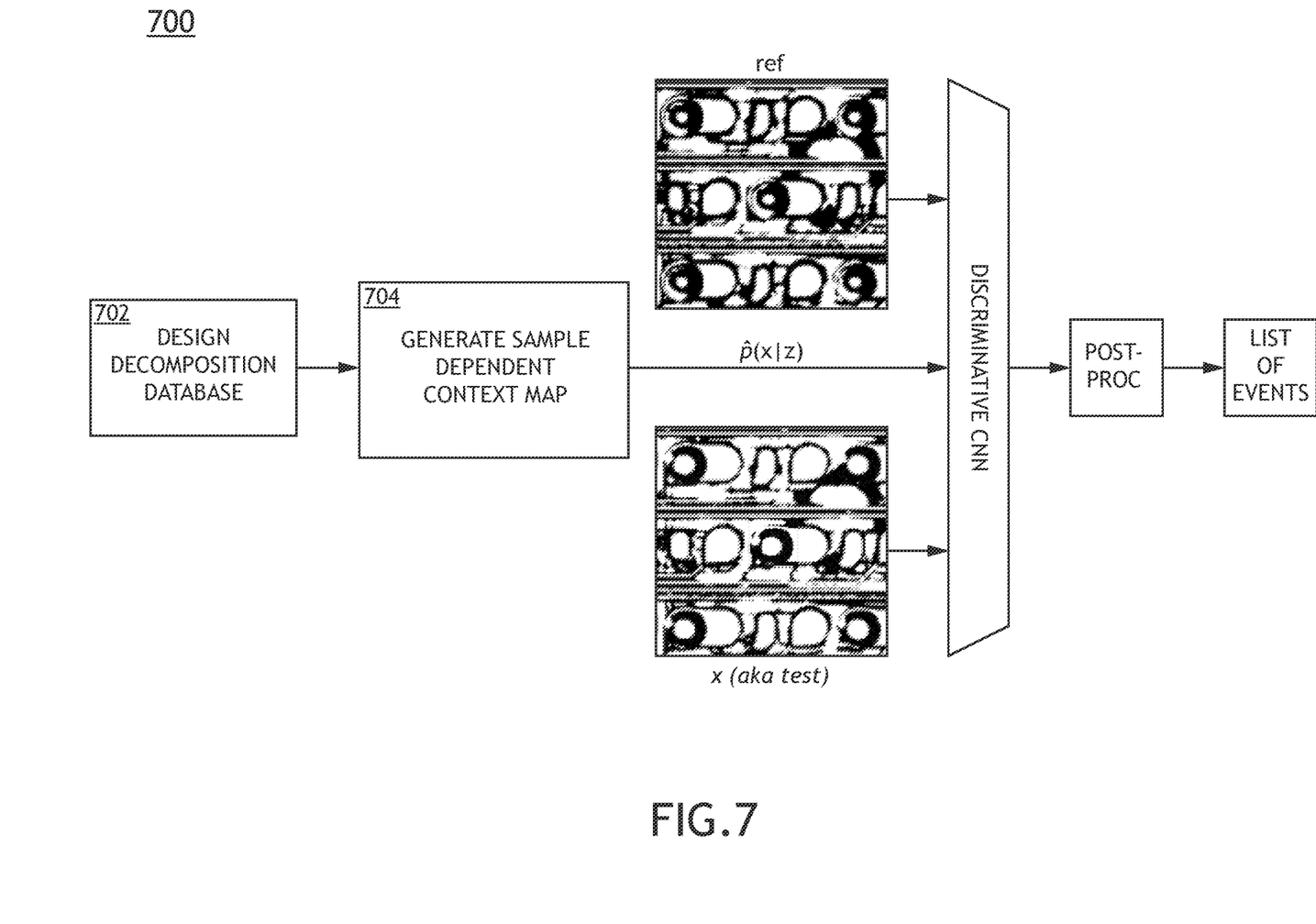
FIG. 7 illustrates a process flow diagram depicting a method of performing context-based inspection using the generated training context map, in accordance with one or more embodiments of the present disclosure.

FIG. 6 illustrates a flowchart depicting a method 600 for performing context-based inspection using a context map including empirical data acquired from a sample prior to being inspected, in accordance with one or more embodiments of the present disclosure. Applicant notes that the embodiments and enabling technologies described previously herein in the context of the inspection system 100 should be interpreted to extend to the method 600. It is further noted, however, that the method 600 is not limited to the architecture of the inspection system 100. FIG. 7 illustrates a process flow diagram depicting a method 700 for generating a context map containing empirical metrology data taken from the sample prior to inspection.

In a step 602, empirical data from a sample to be inspected may be acquired. For example, the controller 124 may be configured to receive metrology data from an optical metrology tool. For instance, the controller 124 may be configured to receive optical metrology data including, but not limited to, critical dimensions, overlay, film thickness, pattern profile, or the like generated by the optical metrology tool and provided to the controller 124. In another instance, the controller 124 may be configured to receive metrology data from an electron beam (e-beam) metrology tool.

By way of another example, the controller 124 may be configured to receive inspection data from the optical imaging sub-system 102. By way of another example, the controller 124 may be configured to receive inspection data from a simulated inspection source.

By way of another example, the controller 124 may be configured to receive process tool data from a process tool including, but not limited to, a scanner, or the like.

In a step 604, one or more context maps may be generated. For example, prior to inspection runtime, the offline controller 130 may be configured to generate one or more context maps based on empirical data acquired from a sample prior to being inspected. The one or more probabilistic context maps may indicate the parametric probability density given sample-dependent context data (z), as expressed by $\hat{p}(x|z)$.

In a step 606, a supervised classifier may be trained based on the one or more generated context maps and a set of labeled training images. When the supervised classifier (e.g., the detection network) is trained with the metrology data (context), the supervised classifier is able to learn the dependance of defect probability as a function of the metrology data.

The supervised classifier may include any type of deep learning classifier or algorithm including, but not limited to, a deep convolutional neural network (CNN), or the like. For example, the supervised classifier may include a supervised discriminative CNN.

In a step 608, one or more reference images may be received. For example, the controller 124 may be configured to receive one or more reference images from the optical imaging sub-system 102. By way of another example, the controller 124 may be configured to receive one or more reference images from an additional optical imaging sub-system. The one or more reference images may represent an ideal or reference. Such a reference image may be generated using any suitable technique. For example, a reference image may be generated using a single image of a reference region with a common design as the test region and known or expected to be free of defects. By way of another example, a reference image may be generated by combining (e.g., averaging, or the like) multiple images of multiple reference regions.

In a step 610, one or more test images may be received. For example, the controller 124 may be configured to receive one or more test images from the optical imaging sub-system 102.

The one or more test images may include various patterned features on the sample. In some embodiments, the one or more test images include one or more DOIs.

In a step 612, the supervised classifier may be applied to the one or more test images to identify the one or more DOIs on the sample. For example, the controller 124, using the supervised classifier, may be configured to identify one or more DOIs on the sample 104.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An inspection system comprising:
one or more controllers including one or more processors to execute program instructions stored in a memory, the one or more program instructions configured to cause the one or more processors to:
receive one or more reference images;
receive one or more test images of a sample, the one or more test images including one or more defects of interest (DOIs);
generate one or more probabilistic context maps during inspection runtime using an unsupervised classifier;
provide the generated one or more probabilistic context maps to a supervised classifier during the inspection runtime; and
apply the supervised classifier to the received one or more test images to identify the one or more DOIs on the sample.

2. The inspection system of claim 1, wherein the generate one or more probabilistic context maps during inspection runtime using an unsupervised classifier further comprises:
generating target context data by removing a defect portion from the one or more test images;
providing the generated target context data to the unsupervised classifier; and
generating, using the unsupervised classifier, one or more generated reference images based on the generated target context data and the received one or more reference images;
calculating an entropy score;
calculating a negative log-likelihood score by comparing the one or more generated reference images from the unsupervised classifier and one or more actual images from the one or more received test image; and
generating the one or more probabilistic context maps based on the calculated entropy score and the negative log-likelihood score.

3. The inspection system of claim 2, wherein the unsupervised classifier comprises an unsupervised generative neural network.

4. The inspection system of claim 3, wherein the unsupervised generative neural network uses a soft clustering technique to generate the one or more generated reference images.

5. The inspection system of claim 4 wherein the soft clustering technique comprises:
a Gaussian mixtures model.

6. The inspection system of claim 1, wherein the supervised classifier comprises a supervised discriminative neural network.

7. The inspection system of claim 1, further comprising:
an optical imaging sub-system communicatively coupled to the one or more controllers.

8. The inspection system of claim 1, wherein the sample comprises a substrate.

9. The inspection system of claim 1, wherein the sample comprises a wafer.

10. The inspection system of claim 1, wherein the sample comprises a mask.

11. An inspection system comprising:
one or more controllers including one or more processors to execute program instructions stored in a memory, the one or more program instructions configured to cause the one or more processors to:
receive empirical data acquired from a sample from a characterization sub-system;
receive design decomposition data from a design decomposition database;
generate one or more probabilistic context maps based on the received empirical data and the received data from the design database prior to inspection runtime;
store the generated one or more probabilistic context maps in the memory;
receive one or more reference images;
receive one or more test images of the sample, the one or more test images including one or more defects of interest (DOIs);
retrieve the stored one or more probabilistic context maps from the memory;
provide the one or more probabilistic context maps to a supervised classifier; and
apply the supervised classifier to the received one or more test images to identify the one or more DOIs on the sample.

12. The inspection system of claim 11, wherein the characterization sub-system comprises:
a metrology sub-system configured to generate metrology data.

13. The inspection system of claim 12, wherein the metrology data comprises at least one of:
critical dimensions data, overlay data, film thickness data, or pattern profile data.

14. The inspection system of claim 11, wherein the design decomposition database includes primitive patterns of the sample by sample location and predicted behavior of the primitive patterns as a function of one or more measured characteristics of the sample, the primitive pattern included in a design of the sample.

15. The inspection system of claim 11, wherein the supervised classifier comprises a supervised discriminative neural network.

16. The inspection system of claim 11, further comprising:
an optical imaging sub-system communicatively coupled to the one or more controllers.

17. The inspection system of claim 11, wherein the sample comprises a substrate.

18. The inspection system of claim 17, wherein the substrate comprises a wafer.

19. The inspection system of claim 11, wherein the sample comprises a mask.

20. An inspection system comprising:
one or more controllers including one or more processors to execute program instructions stored in a memory, the one or more program instructions configured to cause the one or more processors to:
receive empirical data from a characterization sub-system;
generate one or more context maps based on the received empirical data prior to inspection runtime;
train a supervised classifier based on the generated one or more context maps and a set of labeled training images;
receive one or more reference images;

receive one or more test images of a sample, the one or more test images including one or more defects of interest (DOIs); and apply the trained supervised classifier to the received one or more test images to identify the one or more DOIs on the sample.

21. The inspection system of claim 20, wherein the characterization sub-system comprises:

a metrology sub-system configured to generate metrology data.

22. The inspection system of claim 21, wherein the metrology data comprises at least one of:

critical dimension data, overlay data, film thickness data, or pattern profile data.

23. The inspection system of claim 20, wherein the supervised classifier comprises a supervised discriminative neural network.

24. The inspection system of claim 20, further comprising:

an optical imaging system communicatively coupled to the one or more controllers.

25. The inspection system of claim 20, wherein the sample comprises a substrate.

26. The inspection system of claim 25, wherein the substrate comprises a wafer.

27. The inspection system of claim 20, wherein the sample comprises a mask.

* * * * *